UNITED STATES PATENT OFFICE.

JAMES A. MORRELL, OF NEW YORK, N. Y.

IMPROVEMENT IN PROCESSES FOR DELAYING THE FERMENTATION OF SACCHARINE SOLUTIONS.

Specification forming part of Letters Patent No. 141,068, dated July 22, 1873; application filed May 14, 1873.

*To all whom it may concern:*

Be it known that I, JAMES A. MORRELL, of the city, county, and State of New York, have invented a new and useful Improvement in Processes for Delaying the Fermentation of Saccharine Solutions; and I do hereby declare that the following is a full, clear, and exact description of the same.

It is known that the fermentation of nitrogenous liquids can be delayed by causing currents of atmospheric air to pass through them, effecting chemical changes in the nitrogenous constituents by their combination with the oxygen of the air. On the 12th day of September, A. D. 1871, I obtained Letters Patent of the United States, No. 118,875, for an improved process for manufacturing, crystallizing, and refining sugars, wherein currents of rarefied air surcharged with electricity were passed through saccharine solutions for the purpose of evaporating them and crystallizing the sugar. I have since discovered that by passing currents of air heated to a temperature of 212° Fahrenheit scale, or upward, through the cane-juice as it flows from the mill, or through that or other saccharine solutions in vats, the albuminous ingredients contained therein will be coagulated, and the fungous spores which develop fermentation will be destroyed and precipitated, so that such solutions may be retained longer without fermenting than is possible when remaining in their natural state, or when the nitrogenous particles are oxidized by passing currents of air through the liquid in the manner heretofore known. This process is distinguished from that described in my said former Letters Patent in this, that it is used anterior to the work of evaporation, and for the sole purpose of delaying that fermentation which would render such saccharine solution unfit for use.

In manufacturing sugar, more especially on the plantation, it is often inconvenient, if not impossible, to evaporate the juice as rapidly as it is expressed, and it is very important that some convenient means should be at hand for delaying its fermentation. If my said patented process is used for evaporation the same current of electrized air, heated to as high a degree as stated, may be used for the purpose of destroying the germs of fermentation. In other cases a blast and a coil, or other means for heating the air in its passage to the vats, must be employed. In neither case is the application of the hot air to be continued to such an extent as to heat the solution to the point of evaporation.

I do not claim the means for heating the current of air, nor the mode of delaying the fermentation by oxidizing the nitrogenous portions of the solution by merely passing currents of air through the same.

What I claim as my invention, and desire to secure by Letters Patent, is—

The mode of delaying the fermentation of saccharine solutions, in order that they may be preserved for future use, by passing currents of hot air through them, so as to coagulate the albumen and kill the fungous spores contained therein.

In testimony whereof I have signed my name to this specification in the presence of two subscribing witnesses.

JAS. A. MORRELL.

Witnesses:
 R. MASON,
 D. P. HOLLOWAY.